June 25, 1940.  W. T. DUNN ET AL  2,205,470
POWER TRANSMISSION
Filed Oct. 26, 1937   5 Sheets-Sheet 4

INVENTORS.
William T. Dunn,
BY Teno Iavelli
ATTORNEYS.

Patented June 25, 1940

2,205,470

UNITED STATES PATENT OFFICE 2,205,470

POWER TRANSMISSION

William T. Dunn and Teno Iavelli, Detroit, Mich., assignors to Chrysler Corporation, Highland Park, Mich., a corporation of Delaware Application October 26, 1937, Serial No. 171,165

27 Claims. (Cl. 74—262)

This invention relates to power transmission mechanism and refers more particularly to improvements in power transmission systems especially adapted for use in connection with motor vehicles, although not necessarily limited thereto.

Our invention, in certain more limited aspects, provides improvements in the drive and control for power transmission systems having epicyclic or planetary gear trains. It is customary, with such planetary transmissions, to arrange the gearing to provide for the desired number of speed ratios between the engine and vehicle driving ground wheels and such gearing is customarily selected and controlled to obtain the desired driving speed ratio by actuation of any one of a group of transmission controlling devices usually consisting of reaction brake bands associated with and controlling the rotation of corresponding drums or similar elements of the various gear trains.

An object of our invention is to provide a novel and inexpensive means for providing, in response to the selection of a speed ratio, the desired degree of engagement of the selected speed ratio controlling device of the transmission, and remote control means for varying this degree of engagement.

Another object of our invention, in certain more limited aspects, is to provide a variable regulating means whereby the proper fluid pressure, which fluid pressure actuates the fluid operating means for controlling the brake bands and clutches of the planetary gear trains or other corresponding types of transmissions, is effected to provide in response to the selection of a speed ratio the desired degree of engagement of the selected speed ratio controlling device of the transmission; and whereby a suitable remote control is adapted to vary this degree of engagement from a predetermined low to a predetermined high fluid pressure. In the broader aspects of our invention, the fluid pressure is preferably provided by a suitable liquid medium such as oil, but the fluid pressure medium may be air under pressure greater or less than atmospheric pressure.

A further object of our invention resides in the provision of a simple and efficient means for regulating the well known swash plate pump—of such type as is described and claimed in the co-pending application of Augustin J. Syrovy, Serial No. 29,788, filed July 5, 1935—in order to provide, in response to the selection of a speed ratio, the desired degree of engagement of the selected speed ratio controlling device of the transmission; and to provide a selective range of pressures from a predetermined maximum to a predetermined minimum to control the aforesaid degree of engagement.

A still further object of our invention is to provide a means for conveniently controlling the pressure of the accumulator spring of the well known swash plate pump and pressure accumulator—of such type as is described and claimed in the aforesaid application Serial No. 29,788—in order to provide, in response to the selection of a speed ratio, the desired degree of engagement of the selected transmission speed ratio controlling device necessary to control the torque transmitted by that particular speed ratio; and to provide a selective range of pressures from a predetermined high to a predetermined low to control the aforesaid degree of engagement of the selected speed ratio controlling device.

Further objects and advantages of our invention will be apparent from the following detailed descriptions of several illustrative embodiments of the principles of our invention, reference being had to the accompanying drawings, in which:

Fig. 5 is an enlarged sectional elevational view taken approximately as indicated by the line 5—5 of Fig. 1.

Fig. 5—A is an enlarged detail sectional view taken along the line 5A—5A of Fig. 5.

Fig. 6 is an enlarged sectional plan view taken along line 6—6 of Fig. 1 through the transmission and fluid clutch.

Figures 1, 2, 3, 4:
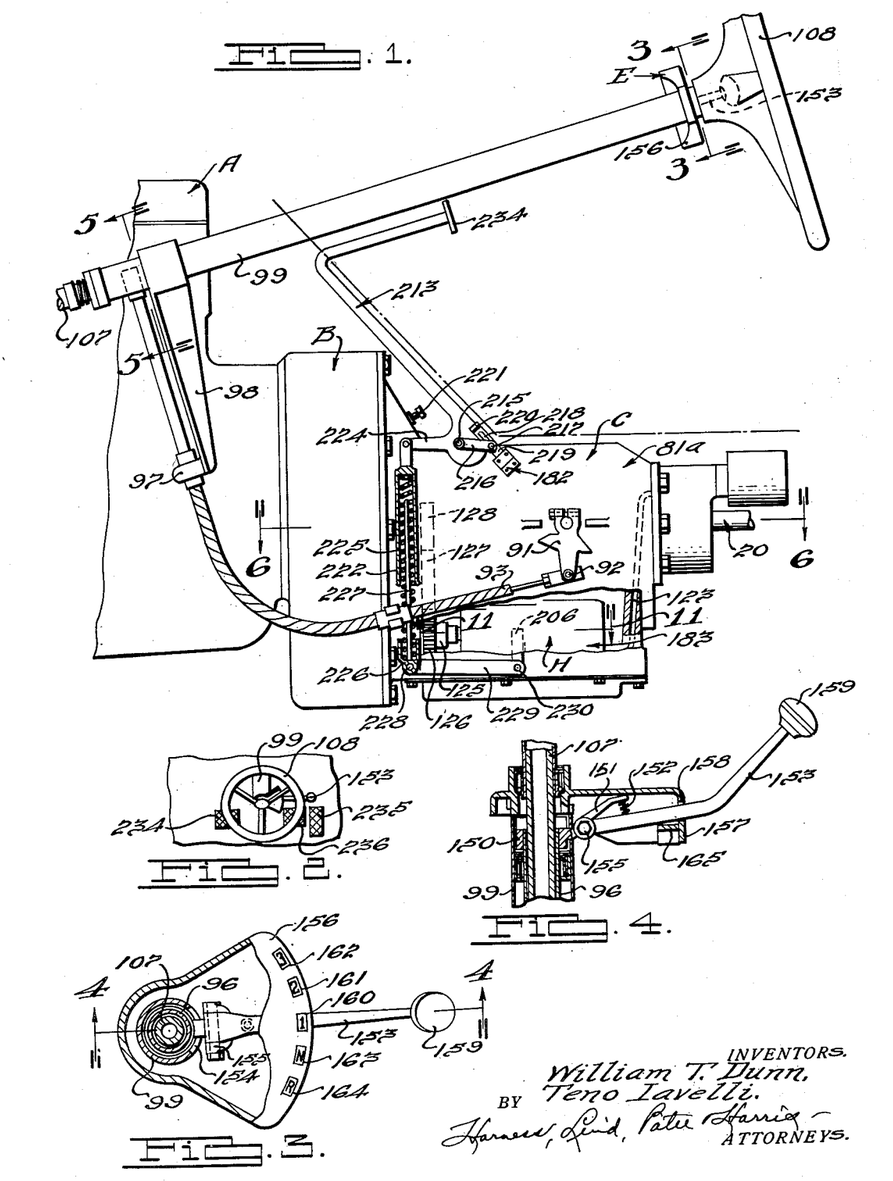
Fig. 1 is a side elevational view, somewhat diagrammatic in form, illustrating our power transmission mechanism as a whole.
Fig. 2 is a detail elevational view showing the manually controlled selector element and the well known foot-operated pedals of a motor vehicle.
Fig. 3 is a sectional view of the manually controlled selecting mechanism taken as indicated by the line 3—3 of Fig. 1.
Fig. 4 is a sectional view along the line 4—4 of Fig. 3.

Referring now to the drawings, we have illustrated our invention in connection with a motor vehicle drive, this drive including a prime mover or engine A, a portion of which is shown in Fig. 1, a main clutch B driven from the engine, and a change speed transmission or gear box C driven from the clutch B. The drive passes from the transmission through the power take-off shaft 20, which, as usual, may extend rearwardly of the vehicle to drive the usual ground wheels (not shown).

The clutch B may be of any suitable construction for controlling the drive between engine A and transmission C, this clutch being illustrated in Fig. 6 in the form of a fluid coupling type having the usual driving and driven cooperating vane members 21 and 22 respectively. The driving vane member 21 is carried by the engine flywheel 23, the latter being connected as usual with the rear end of the engine crankshaft 24. The driven vane member 22 is splined to a hub 25 which in turn is splined at 26 on the forward end of the driven shaft 27. This driven shaft extends rearwardly to drive the power take-off shaft 20 through the intermediary of the various gear trains of transmission C.

Where the power means for operating the transmission is afforded by a fluid such as oil under pressure, the pump for placing the oil under pressure is preferably operated from the engine to maintain the fluid pressure even when the pump is idling. It is therefore preferred to provide a pump drive from the driving clutch member 21 rather than the driven clutch member 22 inasmuch as the latter may be stationary under certain conditions of vehicle operation such as when the vehicle is standing still with the engine idling.

This pump drive may be provided by reason of a driving sleeve or hollow shaft 29 mounted on the shaft 27 but rotatable independently thereof. The sleeve 29 has a hub or flange 30 connected at 31 with the driving vane member 21 of the clutch B so that even when the driven vane member 22 is not being operated from the driving vane member 21, the sleeve 29 will be rotatably driven from the engine crankshaft 24 and flywheel 23. The pump drive from sleeve 29 will be more apparent hereinafter.

We have illustrated the fluid type of clutch B since a clutch of this character has a number of advantages in connection with a transmission of the planetary gear type C and in further connection with our arrangement of vehicle driving controls which will be presently described more in detail. Among the advantages of the fluid type of clutch are the provision of a smooth drive for the vehicle through the planetary transmission, relatively high power driving efficiency, automatic release of the drive between the engine and transmission when the engine is idling, and with the transmission manipulated to establish one of its driving gear ratio settings, and other well known favorable characteristics.

We have illustrated the change speed transmission C as the epicyclic or planetary type, this general form of transmission being well known in the art and, as usual, includes a plurality of transmission speed ratio controlling clutches or brakes 32, 33, 34 and 35, these braking controlling devices being respectively adapted to actuate the transmission in its first speed ratio or low gear, second speed ratio or intermediate gear, third speed ratio or direct drive, and reverse drive. Other speeds may be provided as desired.

Figure 7:
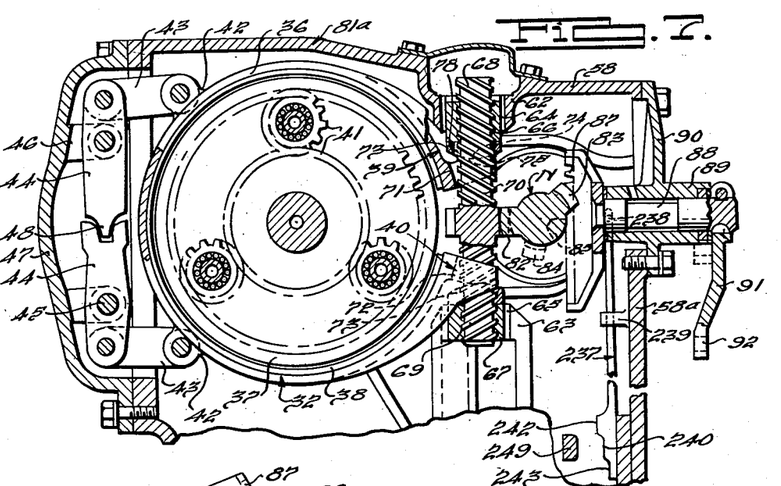
Fig. 7 is a sectional elevational view through the transmission, illustrating one of the speed ratio controlling devices and parts associated therewith, the section being taken as indicated by the line 7—7 of Fig. 6.

The typical brake device 32 illustrated in Fig. 7 consists of an outer band 36 which substantially surrounds the rotary element or drum 37, the band being provided with friction braking material 38 carried by the band and adapted for frictional engagement with the drum 37. The band 36 has its ends formed with laterally projecting actuating flanges 39 and 40 positioned adjacent each other, means being provided to move the band ends toward each other to contract the band 36 for causing the friction material 38 to brake rotary drum 37, the band having sufficient inherent resilience to expand away from contact with the drum when the actuating means is relieved at the flanged ends 39 and 40. In Fig. 7 the low speed ratio braking device 32 is illustrated in its inoperative position whereby the drum 37 is free to rotate through operation of the planetary gear set 41 somewhat diagrammatically illustrated in association with the drum 37. When the braking device 32 is actuated by contracting the band 36, the drum 37 is held against rotation, the driven shaft 20 in such instance being operated through the planetary gearing 41 to provide the low speed drive for the motor vehicle.

In order to anchor the band 36 and to substantially equalize the braking forces applied to drum 37 around the periphery thereof and thereby substantially avoid a tendency toward lateral loading of the drum and planetary gearing transverse to the axis of the drum, we have provided the band with a circumferentially spaced pair of anchoring flanges 42. These flanges are connected through links 43 with the levers 44 pivotally mounted at 45 with the supporting bracket 46 of the transmission side cover casing 47, the levers 44 being interlocked at 48 so that movement of one of the flanges 42 will be transmitted through the pivotal levers 44 and the links 43 to the other portion of the band associated with the anchoring device. The links 43 are thus pivotally connected at their opposite ends respectively with the anchors 42 and levers 44.

The third speed clutching controlling device 34 is arranged for a direct drive through the transmission and differs somewhat from the braking devices 32, 33 and 35 in that the controlling device 34 has its rotary controlling element 50 adapted for clutching action in a well known manner by frictional engagement through the discs 51 by an axially movable clutching member 52. The latter clutching member is thus engaged by the yoked end 54 of an actuating lever 55 pivotally mounted by a pin 56 suitably supported in the transmission casing. On the opposite side of pivot 56 the lever 55 is provided with a step actuating portion 59, the purpose of which will presently be more apparent.

The transmission casing portions 58 and 58ª are respectively provided with the vertically spaced inwardly extending supporting brackets 62 and 63, respectively, these brackets being formed with coaxial splined openings 64 and 65, respectively. Splined within these openings are the nuts 66 and 67 which are axially and oppositely threaded to receive the correspondingly threaded ends 68 and 69 of an operating oscillatory shaft or screw 70.

The shaft 70 extends through openings 71 and 72, respectively, formed to open laterally in the aforesaid band ends 39 and 40, these openings having considerable clearance with shaft 70 so as not to bind on the shaft when the band is contracted and expanded. In order to transmit the thrust of the nuts 66 and 67 to the flanges 39 and 40 so as to relieve distorting loads on the shaft 70 and parts associated therewith, each nut operates a sleeve 73 having a curved face 74 engaging a curved face 75 of band end 39 or 40. The engaged curved faces 74 and 75 provide a rocking freedom of action, each sleeve 73 having a clearance indicated at 78 with the shaft 70.

The operating shaft 70 of the low speed braking device 32 has its portion thereof intermediate the band ends 39 and 40 formed with a gear 77, the means for oscillating shaft 70 through the gear 77 being hereinafter more particularly described.

In the operation of the low speed controlling device 32 as thus far described, it will be apparent that when the shaft 70 is given a rotary movement, such movement operates through the oppositely threaded ends 68 and 69 of the shaft 70 to cause the nuts 66 and 67 to move inwardly toward each other in their splined openings 64 and 65, respectively, this movement acting through the sleeves 73 to contract the band ends 39 and 40 whereby the low speed drum 37 has its rotation checked for establishing the low speed drive through the transmission. When the shaft 70 is rotated in the opposite direction, the nuts 66 and 67 are moved away from each other and the band 36 is expanded to permit the drum 37 to again rotate and thereby relieve the drive through the transmission controlling device 32.

In order to avoid repetition we have not illustrated all of the details of the brake operated means associated with the controlling devices 33 and 35, it being understood that such operating means are similar to that described in connection with the controlling device 32. For convenience of reference the operating shaft or screw for the reverse speed braking device is designated as 70ª and the corresponding shaft for the second speed braking device 33 is designated as 70ᵇ. The gears associated with these screw shafts are respectively designated as 77ª and 77ᵇ. As will be more apparent presently, the gears 77, 77ª and 77ᵇ and lever end 59 are adapted to be selectively operated in order to selectively control the engagement and release of the respective speed ratio controlling devices 32, 35, 33 and 34.

We will next describe the common operating means or selector operating element which is adapted for selective engagement under manual control with the aforesaid screw gears 77, 77ª and 77ᵇ for respectively operating the speed ratio controlling devices 32, 35 and 33; also for operating the direct or third speed controlling device 34; and also for establishing a neutral condition in the transmission.

The transmission casing is adapted to support in a forward opening 78' the reciprocating and oscillating rack or actuating shaft D. The rear bearing for shaft D is provided by a member 79 which is disposed in a suitable opening 80 in the rear end wall 81 of the transmission casing 81ª, the rear end of the actuating shaft D being also supported by a piston for reciprocating the shaft and which will presently be referred to in detail.

This actuating shaft D has a series of teeth forming a rack adapted to be brought into operative association with each of the screw gears, these racks being designated at 82, 83 and 84 for respectively operating the screw gears 77, 77ª, and 77ᵇ. The forward end of shaft D is further provided with a third speed actuating projection 85 adapted for engagement with the lever shoulder 59 for operating the third speed controlling device 34. It will be noted that the racks and projection 85 are longitudinally spaced along the shaft D and that they are also spaced circumferentially of the shaft whereby upon progressive rotation of the shaft only one of the racks and the projection 85 will engage its associated screw gear or lever 55 at any time.

In Figs. 6 and 7 it will be noted that the shaft D is positioned so that the low speed rack 82 is in position for operating the low speed gear 77 and when the shaft D is moved forwardly or to the left as viewed in Fig. 6, the low speed screw 70 will be rotated to cause the aforesaid braking operation of the low speed controlling device 32 for establishing the low speed drive through the transmission. It will, furthermore, be noted that with the low speed rack 82 in the position illustrated, the remaining racks 83, 84 as well as projection 85 are free from engagement with their respective associated gears 77ª, 77ᵇ, and the lever 55. From Figs. 6 and 7 it will be noted that the shaft D has a space longitudinally and circumferentially between the second speed rack 84 and the direct drive projection 85, this space being designated as the neutral space N so that when the shaft is positioned with this space facing the screw gears, each of the racks as well as projection 85 will be free from contact with their associated screw gears and lever 55, and the transmission will be in neutral at which time the various braking devices 32, 33, 34 and 35 are released.

In order to selectively rotate the rack D for selectively engaging the racks and projection 85 thereof with the respective screw gears and lever 55, and also for axially operating the shaft in the various positions of selective adjustment, the following mechanism is provided.

Rearwardly adjacent the reverse rack 83, the shaft D is provided with a circular rack or gear 86 meshing with a segmental rack 87 rotatably journalled by a bearing 89 carried by the transmission side cover 90. The shaft 88 has fixed thereto, outwardly of the transmission cover, a lever 91 connected at 92 (see Fig. 1) to a Bowden wire operating mechanism 93.

Figures 1, 5, 5A:
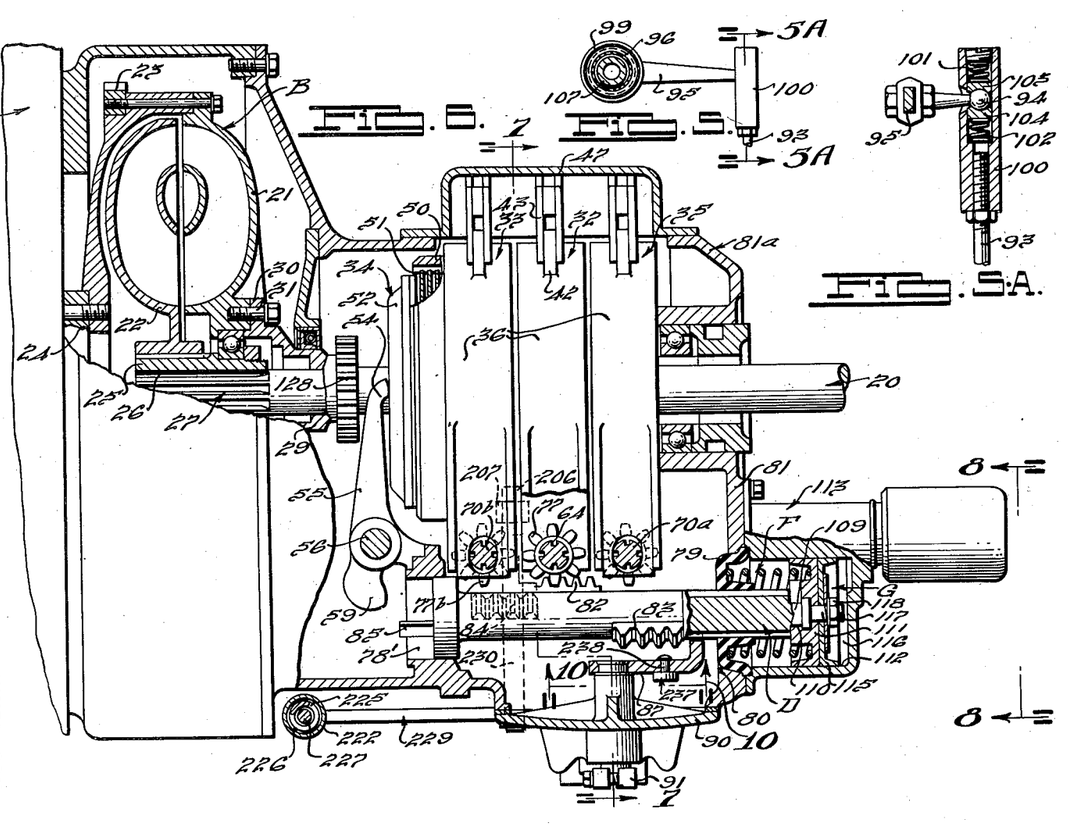

The Bowden wire operating mechanism 93 extends forwardly for pivotal connection with a ball end 94 of a lever assembly 95 secured to a tubular shaft 96 as shown in Figs. 5 and 5A. The forward end of the Bowden mechanism has a guide 97 provided by the bracket 98 rigidly secured to the outer stationary tubular housing 99 comprising the steering post, as best shown in Fig. 1. A yielding connection is preferably provided at some convenient point between the manual selector element, which will be shortly described, and the segmental rack 87 for rotatably adjusting the shaft D. We have illustrated this yielding connection in Fig. 5A intermediate the lever ball end 94 and the forward end of the Bowden wire mechanism 93. The wire 93 is anchored at its forward end to a housing 100 provided with preloaded oppositely acting springs 101 and 102 which respectively act against the ball seats 103 and 104. The springs 101 and 102 have sufficient rigidity so that normally they provide a rigid connection between lever 95 and Bowden wire 93. However, if for any reason the manually operated adjusting mechanism for the shaft D should bind at any point, the mechanism will be protected during any manual adjustment of lever 95 under such conditions by reason of the ability of springs 101 and 102 to yield. This yielding connection is therefore in the nature of a safety device for the manually controlled selector operating mechanism. The hollow operating shaft 96 extends within the housing 99 and is suitably rotatably journalled therein.

Rotatable within the hollow shaft 96 is the hollow steering shaft 107 operably connected at its upper end to a steering wheel 108 and adapted for operable connection at its lower end to the usual steering mechanism for the front ground wheels of the motor vehicle (not shown). The hollow operating shaft 96 extends upwardly to the point preferably just below the steering wheel 108 to the manually controlled device generally designated at E for selectively controlling or manipulating the transmission speed ratios as will be presently more apparent.

Figures 8, 9, 10:
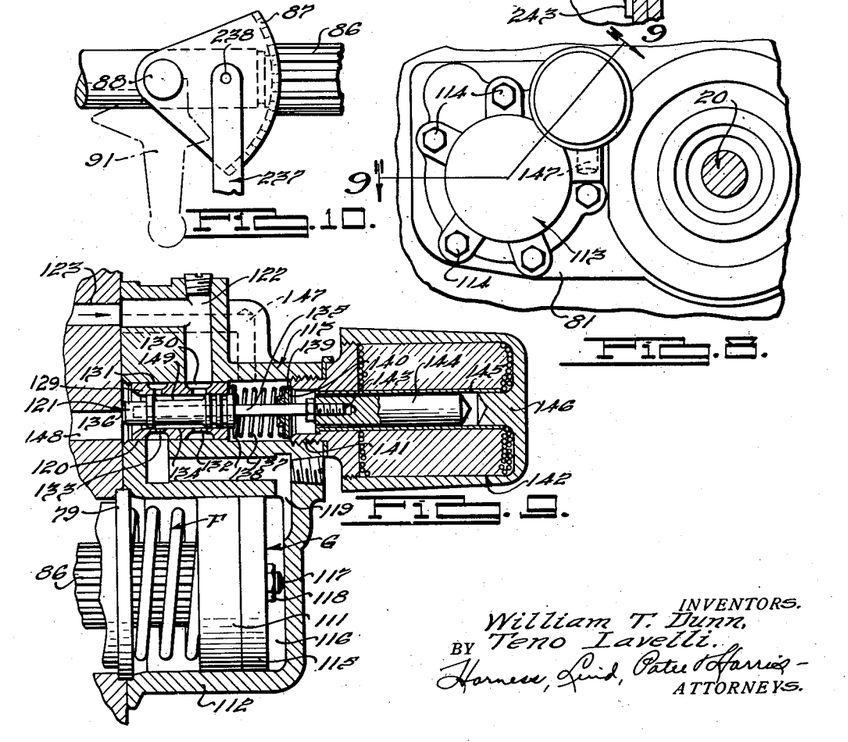
Fig. 8 is a rear elevational view illustrating the housing mechanism for the fluid pressure operator and associated control valve, the view being taken approximately as indicated by the line 8—8 of Fig. 6.
Fig. 9 is a detail sectional elevational view taken along the line 9—9 of Fig. 8.
Fig. 10 is a detail sectional elevational view taken approximately as indicated by the line 10—10 of Fig. 6.

Returning now to Fig. 6, the selector rack shaft D has its rear end adjacent the circular rack 86 provided with a groove 109 adapted to receive the flange 110 of the fluid pressure operating piston assembly 111 adapted for reciprocal movement in the cylinder 112 which is a part of a casting 113 best illustrated in Figs. 8 and 9 as attached at 114 to the rear wall of the transmission. The piston 111 provides the actuating member of the power operating means G for moving shaft D under power to engage the various brake bands and the direct speed clutch 34.

For yieldingly urging the rack shaft D to the right or rearwardly to release the speed ratio controlling devices, we have provided prime mover means F preferably in the form of a compression coil spring surrounding the rear end portion of shaft D between the fixed abutment provided for the bearing member 79 and acting on piston 111. In Fig. 6 it will be noted that the bearing member 79 is conveniently held in position by clamping the same between the rear casing wall 81 of the transmission and the casting assembly 113.

The piston 111 has a flexible sealing cup 115 adapted to seal the piston against escape of the fluid forwardly of the cylinder 112, the cup 115 bearing against the walls of the cylinder under the action of the fluid pressure introduced to the pressure chamber 116. The sealing cup is held in place by the rearwardly extending threaded reduced end 117 of shaft D together with a fastener or nut 118. Fluid, such as oil under pressure, is introduced to the pressure chamber 116 as best shown in Fig. 9, through a passage 119 leading to the valve controlled chamber or cylinder 120 which slidably receives the fluid pressure supply controlling valve 121. The cylinder 120 is supplied with oil under pressure through a passage 122 which receives the oil by a conduit 123 formed in the transmission casing casting. The conduit 123, as best shown in Fig. 1, leads to the delivery side of a swash plate type pump H driven from its location in the oil storing sump or reservoir 124 of the transmission casing by reason of the shaft 125 provided at its forward end by a driving gear 126. This gear meshes with an idler gear 127 which in turn meshes with the driving pinion 128 (see Fig. 6) carried on the rear end of the driving sleeve 29 which, as aforesaid, is fixed to the fluid impeller 21.

A valve guide porting member 129 is pressed into the cylinder 120 so as to be fixed therewith, this porting member having annular conduits 130 and 131, respectively, communicating with the passages 122 and 119. The annular passages 130 and 131 are also respectively provided with the inwardly extending ports 132 and 133 adapted for control by the valve 121. This valve has a sliding fit within the cylindrical bore 134 of the porting member 129 and extending axially through the valve with sufficient clearance to prevent binding thereof, is a valve operating rod 135 preferably of brass or other non-magnetic material. The rod 135 extends forwardly of valve 121 and is provided with a stop 136 adapted to limit forward movement of valve 121 under the influence of a spring 137 which operates between a valve spring abutment 138 and a rear fixed abutment 139, the latter having associated therewith the fluid pressure sealing washers 140 acting against the threaded stem 141 of the electrical solenoid 142.

The rear end of valve operating rod 135 is connected at 143 with the armature 144 of solenoid 142, the armature being adapted for reciprocation in the solenoid cylinder 145 having the rear abutment 146. Any fluid which may leak rearwardly beyond the valve 121 is adapted to drain downwardly from the portion of casting 113 which encloses the valve operating spring 137 by reason of the drain conduit 147, this conduit then extending forwardly to the main body of the transmission where the oil is permitted to drain back to the reservoir 124. A further conduit 148 is adapted to return the oil from operating cylinder 116 back to the reservoir, this conduit 148 opening rearwardly to the forward end of valve 121.

The valve 121 has the reduced valving portion 149 adapted to place the conduits 122 and 119 in communication when the valve is in its forward position under the influence of spring 137. In the drawings, the parts are shown in their positions for operating the low speed controlling device 32, the valve 121 being positioned forwardly so that the fluid pressure is just being delivered from the supply conduit 122 to the conduit 119 and the pressure chamber 116 of the cylinder 112. When the valve 121 moves rearwardly under the influence of solenoid 142, as will be presently more apparent, the spring 137 will be compressed and the reduced portion 149 will no longer provide communication between conduits 122 and 119. At such time the conduit 119 will be open through the port 133 to the discharge conduit 148 for returning the oil from the pressure chamber 116 back to the reservoir 124. When the valve 121 moves forwardly under the influence of spring 137, the reduced valve portion 149 affords communication between conduits 122 and 119 to supply fluid pressure from the pump H to operate the piston 111 and selector rack shaft D forwardly for actuating one of the speed ratio controlling devices 32, 33, 34 or 35, depending on the rotative selective adjustment of the selector rack shaft, as will be presently more apparent.

The function and operation of the manually controlled selector mechanism E in relation to the selector rack shaft D will now be further described.

Secured to the upper end of the hollow operating shaft 96, as best seen in Fig. 4, is an annular collar 150 having an integral laterally extending projection 151 providing an abutment for a spring 152 which has its lower end yieldingly acting against an intermediate portion of a manually operated selector element or lever 153. It will be noted that the extension 151 projects through an arcuate opening 154 of the fixed housing 99 to accommodate oscillatory adjustment of the extension 151.

The inner end of selector lever 153 is pivotally mounted at 155 to an intermediate portion of the collar extension 151 so that the selector lever may have vertical movement on pivots 155 relative to the extension 151 but when lever 153 is moved around the axis of the steering post housing 99, the collar 150 together with the extension 151 and the shaft 96 will be rotatively moved as a unit.

Fixed on the upper end of the housing 99 is a housing 156 preferably in the shape of a sector. The outer end of this housing has a downwardly extending flange 157 provided with an arcuate opening 158 through which the lever 153 extends for arcuate adjustment. The outer end of the selector lever is provided with a knob or handle 159 adapted for convenient grasp by the hand of the motor vehicle driver.

The outer curving edge of housing 156 is preferably formed with a number of legends characterizing the various positions of manual adjustment of selector lever 153 depending on the number of stations of adjustment for this lever. In the particular embodiment illustrated, the selector lever 153 is adapted to have five positions of adjustment, 160, 161, 162, 163 and 164 bearing the legends indicated in Fig. 3 designating the lever positions corresponding to first, second, third, neutral and reverse conditions of control for the transmission.

Figure 13:
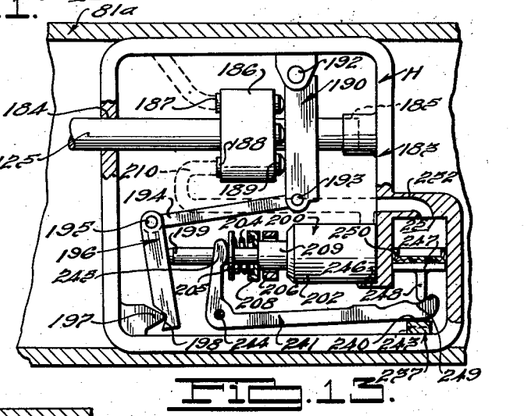
Fig. 13 is a detail sectional plan view corresponding to Fig. 11 but illustrating the swash plate pump in its levelled off condition.

The flange 157 of housing 156 carries an arcuately arranged switch mechanism below the selector lever 153, this mechanism being best illustrated in the wiring diagram of Fig. 13. This switch comprises an arcuate floor 165 provided with a series of grooves or notches 166, 167, 168, 169 and 170 corresponding, respectively, to the positions of selector lever 153 when adjusted to the stations 160 to 164, inclusive. The upper sides of the aforesaid notches are preferably chamfered or beveled, as shown in Fig. 13, and the portion of selector lever 153 engageable with these notches is likewise beveled as indicated at 171.

When the operator desires to select any condition of control of the transmission, he swings the selector lever 153 into the desired position, the spring 152 yieldingly urging the selector lever downwardly into engagement with one of the notches of the switch member 165.

Figure 16:
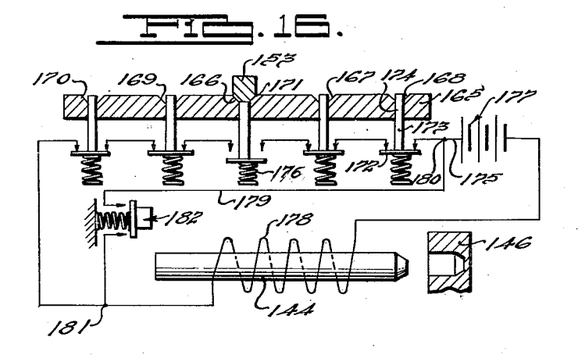
Fig. 16 is a diagrammatic view illustrating the electrical system of control between the manually operated selector element and the fluid pressure control valve mechanism.
Figure 17:
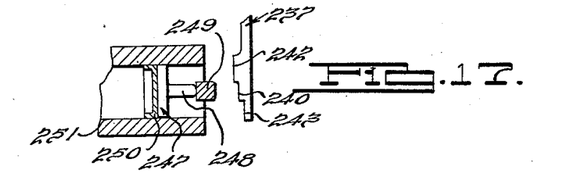
Fig. 17 is a detail sectional elevational view taken approximately as indicated by the line 17—17 of Fig. 11.

Referring now to the wiring diagram illustrated in Fig. 16, we have provided a plurality of switches or contacts 172 for each of the notches of the switch member 165 and being adapted for operation by a stem 173 slidable in an opening 174 communicating with each of the switch notches so that when the selector arm is located in any of the switch notches, one of the stems 173 associated with such notch is engaged by the selector lever and is pushed downwardly by the spring 152 to break the current through the wire 175 which connects all the switches 172 in series. Each switch 172 has a spring 176 associated therewith for restoring the switch to its contacting position and raising its stem 173 as soon as the selector lever is moved out of one of the notches. The wire 175 connects with one terminal of a storage battery 177, the other end of wire 175 being connected to the windings 178 of solenoid armature 144 aforesaid, which is grounded at the other terminal of battery 177. A wire 179 is electrically interposed at 180 and 181 between the extremes of wire 175 to be arranged in parallel with wire 175, a single switch 182 being carried by wire 179 to normally break this circuit as illustrated and under such conditions as will hereinafter be more apparent.

Our manually controlled selector operating mechanism is practically instantaneous in its response to selective adjustment of the lever 153 and the different selections may be made as rapidly as desired. In the general operation of the selector mechanism E for changing the transmission speed ratio, the operator moves the selector lever 153 from one of the station notches in the switch member 165. Just as soon as the selector lever is moved from one of the notches, the switch 172 associated with such notch will be closed, thereby inducing an electrical circuit through the solenoid windings 178 for causing the solenoid armature 144 to move rearwardly against the abutment 146. This rearward movement of the solenoid armature will adjust the valve 121 rearwardly to place the fluid pressure chamber 116 of cylinder 112 in communication with the reservoir discharge conduit 148 whereupon spring F will move the shaft D rearwardly to release any of the controlling devices 32 to 35 which might have been in operation. This entire phase of the operation takes place very quickly during the initial part of adjustment of the selector lever out of one of the notches of the switch member 165. The selector lever 153 may then be moved into any other station of control and dropped into the corresponding notch for such position.

When the selector lever is so released it will be apparent that one of the switches 172 corresponding to such newly selected position will be opened, thereby interrupting the electrical circuit through the wire 175 to the solenoid windings 178. At such time the spring 137 will immediately act to move the valve 121 and armature 144 forwardly to establish communication between the fluid pressure supply conduit 122 and the pressure chamber 116. This will immediately cause a forward movement induced by the fluid pressure on the shaft D for operating one of the selector controlling devices which may have been selected for the new position or else for operating shaft D without causing any movement of any of the speed ratio controlling devices in the event that neutral was selected.

Returning now to the aforesaid cycle of operation and to the point where the selector lever 153 was described as having been moved out of one of the notches preparatory to movement thereof into a newly selected notch, just as soon as the solenoid armature 144 moves rearwardly to operate valve 121 to vent the pressure chamber 116, it will be apparent that the fluid pressure load is removed from the shaft D which is now in its rearward position so that arcuate movement of the selector lever 153 will operate through the hollow steering post shaft 107, Bowden wire mechanism 112, and sector 87 to rotatably adjust the shaft D into a new position for actuation of one of the speed ratio controlling devices. The mechanism operates almost instantaneously so that there is practically no resistance to immediate arcuate adjustment of selector lever 153 from a position in one of the notches although any binding tendency experienced at the shaft D during the initial or other tendency to move the shaft will be taken up yieldingly through the Bowden wire connection shown in Fig. 5A.

Figures 11, 12:
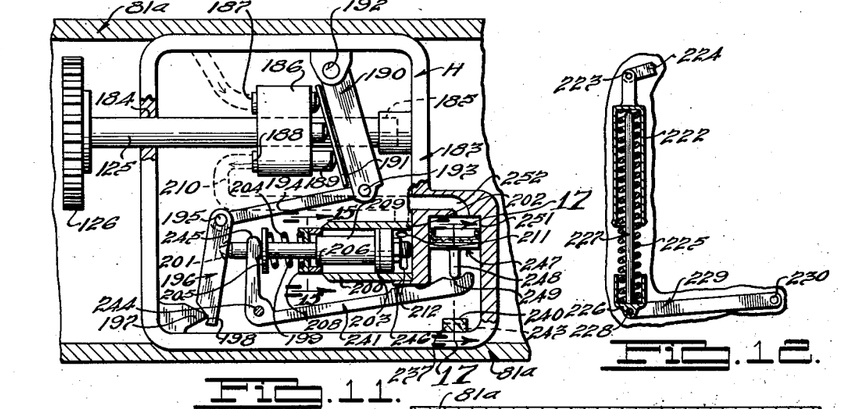
Fig. 11 is a detail sectional plan view of the transmission pump, accumulator, and our fluid pressure control therefor, the section being taken as indicated by the line 11—11 of Fig. 1.
Fig. 12 is a detail elevational view of the remote control linkage of our variable regulating means in its other extreme condition.

Referring now to the details of the pump H and our variable pressure regulating means therefor, the pump assembly includes a casing structure 183 adapted to be attached to the transmission structure as illustrated in Figs. 1 and 11. The casing receives the pump drive shaft 125 aforesaid, which is suitably journalled at 184 and 185 by the casing. Shaft 125 is illustrated with its gear 126 (best shown in Fig. 1) in constant mesh with idler gear 127 which in turn is drivingly connected with the fluid impeller associated driving pinion 128. A pump rotor 186 is drivingly connected to shaft 125. Inlet and outlet passages 187 and 188 respectively supply and deliver fluid in the well known manner to the inlet and outlet ports of the pumping cylinders of rotor 186. The pistons 189 are adapted to operate in the well known circumferentially spaced cylinders opening inwardly toward a wabble or swash plate 190.

The pistons are urged rearwardly in the well known manner, as is described and claimed in the aforesaid application No. 29,788, into contact with the swash plate 190, the inner rounded end of each piston slidably engaging an outer ring 191 which is rotatably supported by plate 190. A suitable pivotal support is provided for plate 190 at 192 on the casing 183. The other side of plate 190 is pivotally connected at 193 to a forwardly extending link 194 pivoted at 195 to a rocker beam 196.

A suitable knife-edge fulcrum 197 on casing 183 is adapted to act against a recess 198 provided by the forward face of beam 196. To oppose the rearwardly acting forces of fulcrum 197 and link 194, the forward end of an accumulator piston rod 199 of a pressure accumulator 200 is adapted to act against the beam 196 through a suitable recess 201 as will presently be more apparent.

Slidable in a cylinder 202 carried by casing 183 is a piston 203 which is adapted under certain conditions to be urged inwardly by a heavy spring 204, the rod 199 being fixed to piston 203 in order to swing the beam 196 for levelling-off the plate 190 and minimizing or eliminating reciprocation of pistons 189. A forward abutment member 205 is slidable on rod 199, as will presently be more apparent, and serves as a forward stop for the spring 204.

Figure 15:
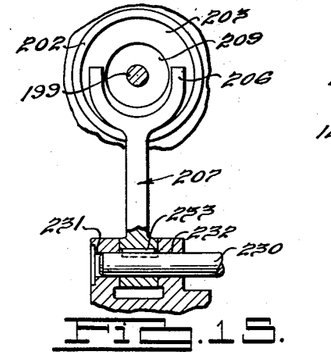
Fig. 15 is a detail sectional elevational view taken as indicated by the line 15—15 of Fig. 11.

A yoke portion 206—best shown in Figs. 11 and 15—of a shifter fork 207 is adapted to normally hold a rear abutment member 208 against the accumulator spring 204 in a pre-loaded condition. The accumulator piston rod 199 has formed thereon a cylindrical portion 209 which is normally positioned away from the abutment member 208 as illustrated in Fig. 11, but is capable of being moved with the piston rod 199 into contact with the member 208 as in Fig. 13, without striking the yoke portion 206. When the piston 203 is urged forwardly by fluid pressure within cylinder 202, as will hereinafter be more apparent, the forward end of rod 199 acts within recess 201 to force the rocker beam counterclockwisely around the fulcrum 197 until the cylindrical portion contacts the abutment member 208—and upon additional pressure build-up within cylinder 202 the portion 209 moves the abutment member 208 just sufficiently to carry it away from the yoke portion as in Fig. 13, and to thereby have the portion 209 take the force of the spring 204 acting through the abutment member 208, at which time the pump swash plate 190 is balanced and the fluid pressure is at its minimum.

As described, the piston 203 moves forwardly in response to the fluid pressure within cylinder 202 as the fluid is delivered by pump H through the intermediary of outlet passage 188 and a conduit 210 to an inlet 211 of the accumulator cylinder 202. The fluid under pressure is led to a suitable point of usage from cylinder 202 through a casing passage 212. The rearward wall of casing 183 closes off the inner end of cylinder 202.

As the shaft 125 drives rotor 186, with plate 190 positioned as in Fig. 11 for maximum stroke, approximately half the pistons 189 are moving inwardly drawing in oil through the inlet passage 187, while the remaining pistons are discharging oil under pressure through outlet passage 188 for passage to cylinder 202 in the well known manner.

When the pump H is initially operated, providing the abutment member 205 is in its Fig. 11 station, the pressure of the oil delivered at inlet 211 to cylinder 202 rapidly builds up to the pressure (determined by the value of spring 204) required to energize the first speed ratio controlling device 32 and as this pressure is being built up the piston 203 moves outwardly to increase the capacity of cylinder 202. During this forward movement of rod 199 to its position of Fig. 13, the rocker beam 196 swings plate 190 about its pivot 192 into a position approximately transverse to the axis of shaft 125. This levelling-off of plate 190 progressively lessens the stroke of pistons 189 until they are substantially motionless so far as reciprocation is concerned, assuming of course that oil under pressure is not being relieved from the delivery system. Any minor leakages which may be present in the delivery system or any movement of the abutment member 205 rearwardly will require only a small movement of the pistons to maintain the maximum desired oil pressure in cylinder 202.

The accumulator cylinder 202 stores oil under pressure so that when oil is delivered under pressure at passage 212, the spring 204 expands and tends to prevent an otherwise rapid fall of the fluid pressure.

When the yoke portion 206 is moved forwardly slightly under the Fig. 13 or maximum fluid pressure condition of pump H, the abutment member 208 is just taken away from its seat on the forward end of the piston rod cylindrical portion 209 —during which movement the fluid pressure is gradually reduced to its predetermined minimum pressure by reason of the pressure chamber not having so great a force to overcome inasmuch as the pressure of the accumulator spring on portion 209 is gradually reduced. We prefer to use a minimum fluid pressure of about one-third of the predetermined maximum for reasons as will hereinafter be more apparent.

The electrical switch 182, if desired, may be suitably mounted on transmission casing 81ª so that a pedal 213 will close the switch at the extreme end of the pedal movement. To this end the pedal 213 has fixed thereto at 215 a link 216 which is supported at its other end at 217 within an elongated slot 218 of an arm 219 of switch 182. An adjustment 220 is adapted to adjust the link support 217 within the slot 218 to insure the closing of the switch 182 when the pedal 213 is about fully depressed against an adjustable stop 221.

It will be noted in the Fig. 16 electrical diagram that when the switch 182 is closed, a circuit is completed through wire 179 between the wire 175 and the solenoid windings 178. It is thus evident that the closing of switch 182 will cause the solenoid armature 144 to move rearwardly to abutment 146 even though one of the switches 172 is open to break the circuit through wire 175. This rearward movement of armature 144 would also be effected when the switch 182 is closed, although all the switches 172 are closed at that time by reason of the vehicle driver lifting the selector lever 153 to select another speed ratio. The rearward movement of the armature 144 opens the conduit 119, through the port 133, to the discharge conduit for returning the oil from the pressure chamber 116 back to the reservoir 124. This armature movement effects a complete release or neutral position for each of the controlling devices 32, 33, 34 and 35 so that no drive is transmitted to the power take-off shaft 20.

Upon the beginning of the return movement of the pedal to its Fig. 1 position, the link support 217 allows the arm 219 to return to its normal position of Fig. 1 at which time the electrical circuit through wire 179 is broken. The breaking of this circuit causes the armature 144 to return to its illustrated station of Fig. 9 under the influence of spring 137, the reduced valve portion 149 again affording communication between conduits 122 and 119 to supply fluid pressure from the pump H to operate the piston 111 and rack D forwardly for actuating one of the speed ratio controlling devices 32 to 35.

Any suitable remote control may be used with our variable pressure pump regulating means, but we prefer to illustrate our invention with a movement reducing linkage wherein a hollow cylinder 222 (best shown in Figs. 1 and 12) has a closed end provided with an articulated connection 223 on bell crank arm 224 of pedal 213. Inside this cylinder 222 is a preloaded coil spring 225 which extends beyond the open end of cylinder 222 and against an end cap 226. A spine member 227 is suitably fixed to an end cap 226 and is adapted to reciprocate within spring 225 to prevent lateral movement of this spring.

A pivotal support 228 for end cap 226 is provided by a link member 229, the other end of this link member having fixed thereto a shaft 230 which extends inwardly toward the vertical longitudinal mid-plane of the transmission C. The shaft 230 is rotatably supported by the casing 81ª at 231 and 232 and is adapted to transmit its axial movement to the shifter fork 207 through a suitable locking means such as key 233—best shown in Fig. 15.

By depressing the face 234 of pedal 213 until the pedal strikes the stop 221, a comparatively long arc of arm 224 is reduced by cylinder 222 compressing the spring 225 as illustrated in Fig. 12, thus effecting but a very short arc of movement of pivotal support 228 about shaft 230. This movement-reducing linkage thereby, with a comparatively longer arc of movement, regulates our variable regulating means which requires a shorter control movement—the spring 225 tending to return the pedal 213 to its Fig. 1 position.

The relationship of the bell crank arm 224 to the support 228 of link member 229 may be made, if desired, so that as the pedal face 234 is depressed to substantially one-third of its complete travel, the member 229 will swing sufficiently to transmit forward movement to the yoke portion 206 for causing the yoke portion to carry the abutment member 208 sufficiently away from the cylindrical portion 209 in its maximum pressure position of Fig. 13 to reduce the pump pressure to about one-half of its aforesaid maximum fluid pressure in the earlier described manner. As the pedal face 234 continues to move toward the stop 221, the yoke portion 206 moves the abutment member 208 forwardly to its predetermined minimum fluid pressure station of Fig. 14 and the pressure of the spring 204 against the cylindrical portion 209 is relieved entirely in order to cause the pump pressure to be reduced to the aforesaid predetermined fluid pressure of about one-third of the maximum pressure.

At the extreme end of the movement of the pedal face 234, the link 216 closes the switch 182 for actuating the solenoid armature 144 to release the controlling devices 32 to 35.

One feature of our invention resides in the simple control that is possible with our novel transmission system, one preferred embodiment of this control being illustrated in Fig. 2 wherein it will be observed that the selector lever 153 is positioned for manipulation laterally to the right of the steering wheel 108 for effecting a change in the condition of the transmission. Our transmission provides for convenient manipulation of the motor vehicle by providing the engine throttle control or accelerator pedal 235 preferably at the right hand side of the steering post 99 so that it may be manipulated by the right foot of the driver. On the same side of the steering post is a pedal 236 which is adapted to operate the wheel brakes of the motor vehicle, and on the other side we have provided the pedal face 234 for convenient manipulation by the left foot of the vehicle driver. The pedal face 234 is thus apparently the well known friction plate clutch pedal, and has the same "feel" when operated by the vehicle driver, as will presently be more apparent.

In addition to the speed ratio device engagement control provided by the actuating of the pedal face 234 whereby the fluid pressure of the pump H is regulatable from a predetermined maximum to a predetermined minimum fluid pressure, we also provide a control wherein our variable regulating means may provide in response to the selected speed ratio controlling device the proper pressure for accommodating the torque transmitted by the engine through that particular speed ratio. Heretofore it has been general practice to use the same pressure for energizing each of the speed ratio controlling devices of the transmission, and this was undesirable in many instances because a compromise had to be made so that the pressure was usually either too high or too low for smooth and quiet actuation, without excessive slippage or grabbing, of most of the speed ratio controlling devices.

To this end we prefer to illustrate our invention with a control responsive to the selection with the selector handle 153 of one of the stations 160, 161, 162 and 164 to energize the speed ratio controlling devices 32, 33, 34 and 35, respectively—it being understood that other speed ratios may be provided if desired without departing from the scope of our invention.

A suitable means may be employed to adjust one of the members of our pressure pump regulator in response to the selection of a speed ratio with the selector handle 153, and to effect this a cam link 237 (best shown in Fig. 7) is appropriately supported by the segmental rack 87 at 238 for movement with the latter and adapted to reciprocate vertically within an extension 239 of the transmission casing portion 58a in response to movement of the selector lever 153.

As illustrated, the link 237 is in its first speed position by reason of the selector lever 153 engaging the first speed station 160, and is adapted to place its first speed cam surface 240 adjacent one of the arms of a bell crank 241. Two other cam surfaces 242 and 243 for second and high, and for reverse speed ratio respectively have been provided on link 237. It is readily evident that the reverse speed surface 243 permits the bell crank 241 (best shown in Fig. 11) to move downwardly further than the first speed surface 240, which in turn has greater effective height than the second and third speed surface 242. We prefer to combine the second and third speeds for the one surface 242 inasmuch as substantially the same torque is transmitted through these speed ratios of the illustrated transmission, although separate cam surfaces may be provided for each of these speeds, or additional speed ratios and cam surfaces may be added, without going beyond the scope of our invention. The effect of these progressive cam surfaces 243, 242 and 240 is to change the pressure pump system a predetermined amount in order to cause the pump H to level off at a definite fluid pressure to effect the desired degree of engagement of the selected speed ratio controlling device.

The bell crank 241 is pivotally supported at 244 on casing structure 183 and a yoke portion 245 is adapted to control the fore and aft movement of abutment member 205. The ratio of the bell crank arms, the effective height of the cam surfaces 243, 242 and 240, and the rate of the spring 204 are such that the degree of contraction of the spring 204 in the selected speed ratio will control the spring pressure against the rear abutment member 208 so that as the cylindrical portion 209 takes the load away from the yoke portion 206 in Fig. 13 it will have to bear the adjusted pressure of the spring 204 to place the fluid pressure system in equilibrium after this condition has been accommodated by the pump pistons 189 reciprocating slightly, if necessary.

In our illustrative embodiment the cam surfaces 243, 240 and 242 respectively cause the yoke portion 245 to progressively allow the spring 204 to expand and relieve the pressure on the abutment member 208, thus causing the pump to level off at a predetermined fluid pressure for each particular speed ratio.

The maximum forward travel of member 205 may be effected by an extension 246 of the casing 183 obstructing the inwardly swinging of the bell crank 241. To normally maintain the bell crank 241 in substantially its Figs. 11 and 13 positions and to allow the link 237 to be moved vertically in response to the selection of another speed ratio, a suitable piston 247 has a finger portion 248 in contact with a recessed end portion 249 of the bell crank 241. The piston 247 with its sealing member 250 are adapted to reciprocate within a cylinder 251 in casing 183 at substantially right angles to the bell crank portion 249.

The face of the sealing member 250 is continuously exposed to the fluid pressure delivered by the pump H through a conduit 252 in communication with the conduit 210. It will be apparent that the pressure within the cylinder 251 will normally maintain the end portion 249 against the selected cam surface 240, 242 or 243 by overcoming the opposing force of the spring 204 tending to move the yoke portion 245 forwardly.

Under this condition the fluid pressure system, assuming, of course, that oil under pressure is not being relieved from the delivery system and the pedal 213 is in its illustrated station of Fig. 1, will build up to its aforesaid predetermined fluid pressure for that particular speed ratio wherein the plate 190 progressively lessens the stroke of pistons 189 until they are substantially motionless so far as reciprocation is concerned. However, if the vehicle operator then desires to select another speed ratio or neutral, he lifts the lever 153 in doing so and the switch 172 associated with the notch 166, 167, 168, 169 or 170 will be closed—thereby inducing an electrical circuit through the solenoid windings 178 for causing the solenoid armature 144 to move rearwardly to adjust the valve 121 to place the fluid pressure chamber 116 of cylinder 112 in communication with the reservoir discharge conduit 148 to effect a release of any of the controlling devices 32 to 35 which might have been in operation.

During this opening of the chamber 116 to the reservoir conduit 148 the escape of fluid lowers the pressure within the accumulator cylinder 202 and the conduit 210 to substantially zero—at which time the fluid pressure in the cylinder 251 is consequently reduced so that the force of the spring 204 moves the yoke portion 245 forwardly in opposition to the reduced pressure in the cylinder 251. This entire phase of the operation occurs very quickly during the initial part of adjustment of the selector lever out of one of the notches of the switch member 165.

The reduction of pressure in the cylinder 251 permits the vehicle operator to move the selector lever 153 into any other station of control inasmuch as the cam link 237 moves vertically to its newly selected position by pressing the end portion 249 inwardly. When the selector lever 153 is so released it will be apparent that one of the switches 172 corresponding to such newly selected position will be opened, thereby interrupting the electrical circuit through the wire 175 to the solenoid windings 182. At such time the spring 137 will immediately act to move the valve 121 and armature 144 forwardly to establish communication between the fluid pressure supply conduit 122 and the pressure chamber 116. This will immediately cause a forward movement induced by the fluid pressure on the shaft D for operating one of the selector controlling devices which might have been selected for the new position or else for operating shaft D without causing any movement of any of the speed ratio controlling devices in the event that neutral was selected. Immediately upon this forward movement of valve 121 the fluid pressure system is again closed and the stroke of the pistons is increased to effect the fluid pressure determined by the newly selected cam surface and its effect on the spring 204 through the piston 247 and the bell crank 241.

The function of the pedal control is independent of the bell crank 241 control to the extent only that the pedal may be depressed to any degree at any time to vary the pressure of the spring 204 on the cylindrical portion 209 to reduce the fluid pressure to zero with the aid of the switch 182 in moving the valve 121 forwardly. During this change in fluid pressure the pressure on the piston 247 will vary accordingly so that the spring 204 will have less and less force to overcome in moving the yoke portion 245 forwardly, so that the vehicle driver may select the speed ratios, as described earlier, with desirable characteristics of slippage as effected by his control of the pedal 213. It is obviously evident that the vehicle operator need not depress the pedal at all, inasmuch as the lifting of the lever 153 will adjust the valve 121 rearwardly to place the fluid pressure chamber 116 in communication with the reservoir discharge conduit 148 at which time the fluid pressure in the cylinder 251 is reduced to permit the cam link 237 to be adjusted to its new position when the selector lever 153 is swung to its newly selected notch and released therein to cause the valve 121 to move forwardly to operate the transmission in the selected speed ratio.

In the operation of our transmission when the vehicle operator desires to depress the pedal remote control, preferably prior to the selection of a new speed ratio, during the first one-third of the maximum movement of the maximum travel of the pedal face 234 the yoke portion 206 moves the abutment member 208 sufficiently away from the cylindrical portion 209 to effect a decrease in the fluid pressure to about one-half of the predetermined maximum fluid pressure— the speed ratio controlling device 32, 33, 34 or 35 providing the prior speed ratio drive in the meantime being operated with less and less pressure in cylinder 202 and consequently with more and more slippage of the drum 37.

Figure 14:
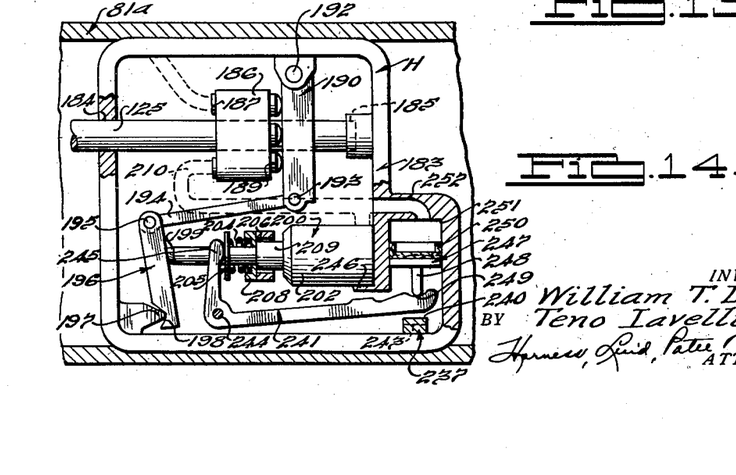
Fig. 14 is a detail sectional plan view corresponding to Figs. 11 and 13 but illustrating the pump in its minimum pressure state.

Completion of the pedal travel moves the abutment member 208 further and further away from the cylindrical portion 209 to its Fig. 14 condition, and very gradually decreases the fluid pressure to about one-third of the predetermined maximum pressure so that the selected controlling device 32 to 35 is operated by less and less pressure in the cylinder 202 until there is just sufficient pressure to prevent the drum 37 from slipping undesirably. At the extreme of the pedal movement the link 216 closes the switch 182 to move the solenoid armature rearwardly to completely release all the controlling devices 32 to 35.

On the return movement of the pedal face 234, assisted by the spring 225, the link 216 allows the switch 182 to open again and return the armature 144 in the earlier described manner, and the fluid pressure is controlled in a manner just the reverse of the downward pedal movement until the pedal face is again in its Fig. 1 station at which time the fluid pressure is once more at the predetermined maximum.

As described the increased slippage of the drum 37 is very gradual as the pedal face 234 is depressed. Furthermore, the relationship of the arm support 223 to the link support 228 is such that one-half of the maximum fluid pressure is reduced while the pedal face travels about one-third of its total movement, and that the fluid pressure is further gradually reduced to about one-third of its predetermined maximum as the pedal movement is completed, at which time the switch 182 is closed to give a neutral position for the transmission C. The vehicle operator always effects a smooth and quiet speed ratio change as he desires, inasmuch as the slippage of the selected controlling device is high until the pedal face 234 is nearly at its Fig. 1 position. The downward or the upward travel of the pedal face 234 can be made in one movement if desired, and the operation of our variable regulating means in response thereto is almost instantaneous.

It is unnecessary for the vehicle driver to completely depress the pedal face while selecting a speed ratio. For example, he may depress the pedal face to a predetermined distance to effect a predetermined amount of slippage of the selected controlling device—depending on the kind of vehicle performance he desires. On the other hand, he need not move the pedal face at all while selecting a speed ratio, for the fluid clutch B and the speed ratio controlling device will absorb to a great extent any harsh action resulting from such a power shift.

It is not our intention to limit our invention to the degrees of fluid pressure control hereinbefore described, since these are for illustrative purposes only; and other forms of suitable remote controls may be used if desired.

The selector operating mechanism is practically instantaneous in its response to selective adjustment of the lever 153 and the different selections may be made as rapidly as desired. In the general operation of the selector mechanism E for changing the transmission speed ratio, the operator depresses the pedal face 234 if he desires certain speed ratio change characteristics at that instant, and lifts the selector lever 153 from one of the station notches in the switch member 165. Just as soon as the pedal face 234 is completely depressed the switch 182 will be closed to reduce the fluid pressure to practically zero by moving the valve 121 rearwardly which will consequently reduce the fluid pressure in the cylinder 251. On the other hand, if the pedal face is not depressed at all or not sufficiently to close the switch 182, just as soon as the selector lever is moved from one of the notches, the switch 172 associated with such notch will be closed—thereby inducing an electrical circuit through the wire 175 to the solenoid windings 178 for moving the solenoid armature 144 rearwardly. This rearward movement of the solenoid armature will adjust the valve 121 rearwardly to place the fluid pressure chamber 116 of cylinder 112 in communication with the reservoir discharge conduit 148 whereupon the spring F will move the shaft D rearwardly to release any of the controlling devices 32 to 35 which might have been in operation.

During this opening of the chamber 116 to the conduit 148 the fluid pressure in the cylinders 202 and 251 is substantially lowered at which time the cam link 237 may easily be moved vertically because the piston 247 is not forcing the end portion 249 against the cam link. The selector lever 153 may then be swung to any other station of control and simultaneously the cam link 237 moves vertically to its newly selected position: i. e., for second and third, first and reverse speed ratio the cam surfaces 242, 240 and 243 respectively are adjacent the end portion 249 to control the pressure of the spring 204 against the abutment member 208.

When the selector lever 153 is released in its newly selected control station notch, one of the switches corresponding to such newly selected position will be opened thereby interrupting the electrical circuit through the wire 175 to the solenoid windings 182. At that time the spring 137 will immediately act to move the valve 121 and armature 144 forwardly to establish communication between the conduit 122 and the pressure chamber 116. This will immediately cause a forward movement induced by the fluid pressure on the shaft D for operating one of the selector controlling devices, or else for effecting the neutral condition of the transmission C. Instantaneously upon this forward travel of the valve 121 the fluid pressure system is again closed and the stroke of the pistons 189, after the pedal face 234 is substantially returned, is increased to effect the fluid pressure determined by the newly selected cam surface 240, 242, or 243 and its effect on the spring 204 through the piston 247 and the bell crank 241.

The speed ratio change having been made with the selector arm 153, the vehicle operator then returns the pedal face 234—providing he has depressed it—to its normal position which causes the selected speed ratio controlling device during that pedal face movement to smoothly and quietly increase its braking effect on the drum in providing the newly selected speed ratio. If, however, the pedal face had been fully depressed before the speed ratio selection, upon concluding this selection the vehicle driver allows the pedal face to return to its normal position of Fig. 1 to effect the desired speed ratio drive. During this return movement of the pedal face the switch 182 is allowed to open again and return the armature 144 and the valve 121, and this rearward movement of the valve 121 does not occur even though the selector lever 153 has already been moved into the notch corresponding to the newly selected speed ratio and opened that particular switch to interrupt the electrical circuit through the wire 175 to the solenoid windings 182, inasmuch as an electrical circuit is still provided through the switch 182 to keep the valve 121 in its rearward position.

In operating our transmission the various speed ratio selections may be made quickly and easily, aided by the speed ratio controlling device engagement characteristics effected by depressing the pedal to suit the driver's desire, and each speed ratio controlling device is energized sufficiently to satisfactorily handle the torque transmitted by the engine A through that gear train. This also allows a wider range in designing power transmitting devices inasmuch as each speed ratio may reasonably be out of proportions with the others.

Bearing pressures and possibilities of the failure of parts are decreased by our variable regulating means by reason of the fluid pressure for each speed ratio controlling device being just sufficient to handle the torque transmitted through each particular speed ratio. The moving parts are therefore not subjected to continuous excess pressures and the pump H need not maintain the "compromise" high fluid pressure necessary without our variable regulating means.

A suitable remote control such as the illustrated pedal 213 is particularly desirable, among other advantages, in operating our variable regulating means when starting the vehicle motor in cold weather, inasmuch as the speed ratio controlling devices are allowed to slip to suit the driver's convenience as he depresses the pedal preparatory to warming up the engine or to making the speed ratio changes while driving the vehicle. Without our arrangement the vehicle would creep by reason of this particular characteristic of the fluid coupling B and the fact that the oil on the speed ratio controlling devices is cold and tacky, and furthermore the engagement of these controlling devices would be harsh because of the high fluid pressure produced by the pump when the engine is idling fast—all of which tends to effect unevenness of control and stalling of the engine.

Figure 18:
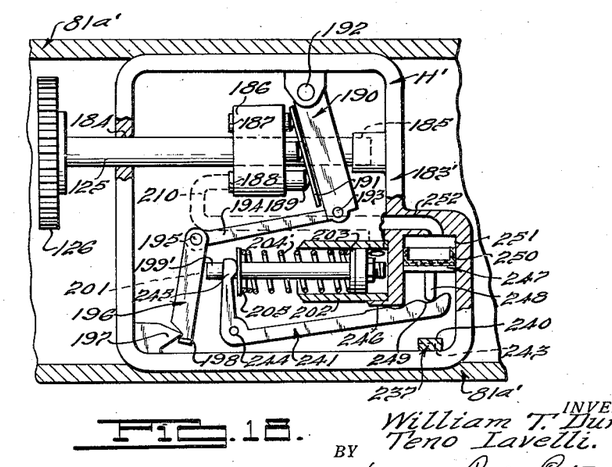
Fig. 18 is a detail sectional plan view corresponding to Fig. 11 but illustrating another embodiment of our fluid pressure control for the transmission pump.

Referring to Fig. 18 in which we have illustrated a modified embodiment, it will be understood that this modified arrangement is intended to be substituted for the parts previously described and the entire mechanism and its operation will not again be duplicated. Parts of similar function but different construction have been indicated by primed reference characters.

It will be noted that we have eliminated the pedal control so that our variable regulating means is entirely responsive to the selection of a station with the selector lever 153.

The piston 203 is adapted to reciprocate within the cylinder 202 and is urged rearwardly by a heavy spring 204' which surrounds a piston rod 199' and abuts against the member 205 journalled on the rod 199'.

In the operation of this embodiment of our invention the piston 203 moves forwardly in response to the fluid pressure within the cylinder 202 as the fluid is delivered by the pump H through the intermediary of the outlet passage 188 and the conduit 210 to the inlet 211 of the accumulator cylinder 202. The cylinder 251 is continuously exposed to the pressure in the conduit 210 and when the cam link 237 is in its illustrated first speed position, the pump continues to increase the pressure to the predetermined amount determined by the rate of the spring 204' bearing against the piston 203. Similarly, if the second and third speed cam surface 242 or the reverse speed cam surface 243 is adjacent the end portion 249, the fluid pressure in the system will be increased by the pump H to a predetermined pressure before levelling off the swash plate 190.

In operating the vehicle the driver merely lifts the lever in selecting a different speed ratio which adjusts the valve 121 rearwardly to place the fluid pressure chamber 116 in communication with the reservoir discharge conduit 148 at which time the fluid pressure in the cylinder 251 is reduced to permit the cam link 237 to be adjusted to its new position 240, 242 or 243 when the selector lever 153 is swung to its newly selected notch and released therein to cause the valve 121 to move forwardly to operate the transmission in the selected speed ratio. The various speed ratios may be selected easily and quickly, and the pump H furnishes in response to the cam link settings 240, 242 and 243 a predetermined pressure to satisfactorily energize each of the speed ratio controlling devices 32, 33 and 34, and 35 respectively to control the torque transmitted by the engine A through the selected controlling device.

Various modifications and changes will be apparent from the teachings of our invention as set forth in the appended claims, and it is not our intention to limit our invention to the particular details of construction and operation shown and described for illustrative purposes.

What we claim is:

1. In a motor vehicle transmission having a plurality of speed ratio controlling devices, pressure fluid operated means including a common operating member for selectively operating said devices, manually operable means for controlling the selective operation of said operating member, means for supplying pressure fluid to said member, and means operable by said manually operable selector means for varying the pressure of the fluid supplied to said member.

2. In a motor vehicle transmission having a plurality of speed ratio controlling devices, pressure fluid operated means including a common operating member for selectively operating said devices, manually operable means for controlling the selective operation of said operating member, means for supplying presssure fluid to said member, pressure responsive means for controlling the pressure fluid supply to said member, and means operable by said manually operable selector means for causing said pressure responsive member to vary the pressure of the fluid supplied to said member.

3. In a motor vehicle transmission having a plurality of speed ratio controlling devices, pressure fluid operated means including a common operating member for selectively operating said devices, manually operable means for controlling the selective operation of said operating member, means for supplying pressure fluid to said member, including an element movable by fluid pressure in said supply means for controlling the pressure of the fluid supplied to said member, yielding means opposing fluid presssure movement of said element, and pressure responsive means operable to vary the opposition of said yielding means opposing fluid pressure movement of said element.

4. In a motor vehicle transmission having a plurality of speed ratio controlling devices, pressure fluid operated means including a common operating member for selectively operating said devices, manually operable means for controlling the selective operation of said operating member, means for supplying pressure fluid to said member, including a fluid pressure operated element for controlling the pressure fluid supply to said member, yielding means opposing fluid pressure operation of said element, pressure responsive means for varying the opposition of said yielding means to fluid pressure operation of said element, and means operable by said manually operable selector means for varying the effective opposition of said pressure responsive means to said yielding means.

5. In a motor vehicle transmission having a plurality of speed ratio controlling devices, pressure fluid operated means for selectively operating said devices, means for controlling the selective operation of said pressure fluid operated means, means for supplying pressure fluid to said pressure operated means, mechanism responsive to the pressure of fluid delivered by said supply means for controlling the pressure of the fluid delivered by the latter, and means operable by said control means for causing said mechanism to vary the pressure delivered by said supply means.

6. In a motor vehicle transmission having a plurality of speed ratio controlling devices, pressure fluid operated means for selectively operating said devices, means for controlling the selective operation of said pressure fluid operated means, means for supplying pressure fluid to said pressure operated means, mechanism for regulating the pressure of fluid delivered by said supply means, said mechanism including a member responsive to the pressure of fluid delivered by said supply means, means opposing the action of said pressure responsive member, and means responsive to operation of said selector means for varying the opposition of the means opposing the action of said pressure responsive member.

7. In a motor vehicle transmission having a plurality of speed ratio controlling devices, pressure fluid operated means for selectively operating said devices, means for supplying pressure fluid to said pressure operated means, means including an element operable by the pressure of fluid delivered by said supply means for controlling the pressure of the fluid delivered by the latter, said control means further including a second pressure fluid operated element acting in opposition to said first mentioned element, and means for varying the effective opposition of said second mentioned pressure responsive element to fluid pressure operation of said first mentioned element.

8. In a motor vehicle transmission having a plurality of speed ratio controlling devices, pressure fluid operated means for selectively operating said devices, means for controlling the selective operation of said pressure fluid operated means, means for supplying pressure fluid to said pressure operated means, means including an element operable by pressure of fluid delivered by said supply means for controlling the pressure of the fluid delivered by the latter, said control means further including a second pressure fluid operated element acting in opposition to said first mentioned element, and means operable by said selector means for varying the effective opposition of said second mentioned element to fluid pressure operation of said first mentioned element.

9. In a motor vehicle transmission having a plurality of speed ratio controlling devices, pressure fluid operated means for selectively operating said devices, means for controlling the selective operation of said pressure fluid operated means, means including a pump for supplying pressure fluid to said pressure operated means, and means operable in response to operation of said control means for varying the operation of said pump.

10. In a motor vehicle transmission having a plurality of speed ratio controlling devices, pressure fluid operated means for selectively operating said devices, means for controlling the selective operation of said pressure fluid operated means, means including a pump for supplying pressure fluid to said pressure operated means, and means operable in response to operation of said control means for substantially predetermining the maximum fluid displacement of said pump.

11. In a motor vehicle transmission having a plurality of speed ratio controlling devices, pressure fluid operated means for selectively operating said devices, means for controlling the selective operation of said pressure fluid operated means, means including a pump for supplying pressure fluid to said pressure operated means, said pump comprising a plurality of reciprocating pistons delivering fluid under pressure for operation of said pressure operated means, a wabble plate structure for controlling the pressure of fluid delivered by said pistons, pressure fluid responsive means for controlling said wabble plate structure, and means responsive to operation of said selector means for varying the control of said wabble plate structure by said pressure responsive means.

12. In a motor vehicle transmission including a plurality of selectively operable fluid pressure operated speed ratio controlling devices constructed and arranged for operation at relatively differing predetermined pressures of fluid, pressure fluid operating means including a common operating member for selectively operating said devices, manually operable means for controlling the selective operation of said member, means for supplying pressure fluid to said member, and means operable by said selector means in response to the selective operation of one of said devices for causing supply means to deliver a fluid pressure to said member substantially corresponding to said predetermined operating fluid pressure of the device selected.

13. In a motor vehicle transmission including a plurality of selectively operable fluid pressure operated speed ratio controlling devices constructed and arranged for operation at relatively differing predetermined pressures of fluid, pressure fluid operating means including a common operating member for selectively operating said devices, manually operable means for controlling the selective operation of said member, means for supplying pressure fluid to said member, control mechanism for predetermining the fluid pressure delivered to said member, and means operable by said selector means in response to the selective operation of one of said devices for conditioning said control mechanism to cause said supply means to deliver a predetermined fluid pressure to said member substantially corresponding to said predetermined operating fluid pressure of the device selected.

14. In a motor vehicle transmission having a plurality of speed ratio controlling devices, fluid pressure operated means including a common operating member for selectively operating said devices, manually operable means for controlling the selective operation of said operating member, means including a pump for supplying pressure fluid to said member, valve mechanism actuatable in response to operation of said manually operable means for controlling the supply of pressure fluid to said operating member, and means operable by said manually operable means for varying the pressure of fluid delivered by said pump.

15. In a motor vehicle transmission having a plurality of speed ratio controlling devices, fluid pressure operated means including a common operating member for selectively operating said devices, manually operable means for controlling the selective operation of said operating member, means for supplying pressure fluid to said member, mechanism operable in response to operation of said manually operable means for controlling the operation of said member, and means operable by said manually operable means for regulating the pressure of fluid delivered by said supply means.

16. In a motor vehicle power transmitting mechanism including a plurality of selectively operable fluid pressure operated speed ratio controlling devices constructed and arranged for operation at relatively differing predetermined pressures of fluid, a pump for supplying a fluid under operating pressure for operation of said devices, driver manipulated means for selectively controlling fluid pressure operation of said devices, and means operable in response to manipulation of said driver manipulated means in operatively selecting one of said devices for causing said pump to deliver a fluid pressure substantially corresponding to said predetermined operating fluid pressure of the device selected.

17. In a power transmitting mechanism including a plurality of selectively operable fluid pressure operated speed ratio controlling devices, means for controlling the selective operation of said devices, a pump for supplying a fluid under operating pressure for operation of said devices, and means operable by said control means for varying the fluid delivery output of said pump.

18. In a power transmitting mechanism including a plurality of selectively operable fluid pressure operated speed ratio controlling devices, means for controlling the selective operation of said devices, means for supplying a fluid under operating pressure for operation of said devices, mechanism for varying the pressure of fluid delivered by said supply means, and means responsive to operation of said control means for causing said mechanism to vary the pressure of fluid delivered by said supply means.

19. In a motor vehicle power transmitting mechanism including a plurality of selectively operable fluid pressure operated speed ratio controlling devices, vehicle driver operated means operable to cause selective operation of said devices, a pump for supplying a fluid under operating pressure to said devices, and means responsive to operation of said vehicle driver operated means to cause selective operation of said devices for varying the fluid delivery output of said pump.

20. In a power transmitting device including a fluid pressure operated drive control device, a pump for supplying a fluid under operating pressure to said device, valve means operable to control the communication of fluid from said pump to said device, selector means operable to effect operation of said valve means, and means responsive to operation of said selector means to effect operation of said valve means for varying the pressure of fluid delivered by said pump.

21. In a power transmitting mechanism including a plurality of drive control devices, a plurality of fluid pressure operated braking devices for respectively operating said speed ratio controlling devices, a pump for supplying a fluid under operating pressure for operation of said brake devices, means including a manually operable member for selectively controlling operation of said braking devices, and means responsive to operation of said manually operable member for varying the pressure of fluid delivered by said pump.

22. In a power transmitting mechanism including a plurality of selectively operable fluid pressure operated speed ratio controlling devices, means for controlling the selective operation of said devices, a pump for supplying a fluid under operating pressure for operation of said devices, and means operable in response to operation of said control means for varying the operation of said pump.

23. In a power transmitting mechanism including a plurality of selectively operable fluid pressure operated speed ratio controlling devices, means operable to effect selective operation of said devices, a pump for supplying a fluid under operating pressure for operation of said devices, valve means operable in response to operation of said first mentioned means for controlling fluid pressure operation of said devices, and means operable in response to operation of said first mentioned means to effect operation of said valve means to vary the fluid delivery output of said pump.

24. In a motor vehicle transmission having a plurality of speed ratio controlling devices, pressure fluid operated means including a common operating member for selectively operating said devices, manually operable means for controlling the selective operation of said operating member, means for supplying pressure fluid to said member, and means operable by said member in response to selective operation of the latter by said manually operable means for regulating the pressure of the fluid supply to said member.

25. In a motor vehicle transmission having a plurality of speed ratio controlling devices, pressure fluid operated means including a common operating member for selectively operating said devices, manually operable means for controlling the selective operation of said operating member, means for supplying pressure fluid to said member, pressure responsive means for controlling the pressure delivery of said supply means, and means operable by said member in response to the selective operation of the latter by said manually operable means for causing the pressure responsive means to vary the pressure of fluid delivery of said supply means.

26. In a motor vehicle transmission having a plurality of speed ratio controlling devices, pressure fluid operated means for selectively operating said devices, means for controlling the selective operation of said pressure fluid operated means, means for supplying pressure fluid to said pressure operated means, and means operable by said pressure fluid operated means in response to selective operation thereof for controlling the pressure of fluid delivered by said supply means.

27. In a power transmitting mechanism including a plurality of selectively operable fluid pressure operated speed ratio controlling devices, means including a common operating member for selectively operating said devices, manually operable means controlling operation of said member, a pump operable to supply fluid under pressure for operation of said devices, and means operable by said member for regulating the operation of said pump.

WILLIAM T. DUNN.
TENO IAVELLI.

CERTIFICATE OF CORRECTION.

Patent No. 2,205,470.                                June 25, 1940.

WILLIAM T. DUNN, ET AL.

It is hereby certified that error appears in the printed specification of the above numbered patent requiring correction as follows: Page 11, first column, line 40, claim 3, before the word "including" insert --means--; line 46, same claim, for "opposing fluid pressure move-" read --to fluid pressure movement of--; line 55, claim 4, before "including" insert --means--; and that the said Letters Patent should be read with this correction therein that the same may conform to the record of the case in the Patent Office.

Signed and sealed this 25th day of February, A. D. 1941.

(Seal)

Henry Van Arsdale,
Acting Commissioner of Patents.